(12) United States Patent
Newman et al.

(10) Patent No.: US 12,159,379 B1
(45) Date of Patent: Dec. 3, 2024

(54) SYSTEMS AND METHODS FOR SIMULATING MOTION BLUR

(71) Applicant: GoPro, Inc., San Mateo, CA (US)

(72) Inventors: David Newman, San Diego, CA (US); Robert McIntosh, Marina Del Rey, CA (US)

(73) Assignee: GoPro, Inc., San Mateo, CA (US)

( * ) Notice: Subject to any disclaimer, the term of this patent is extended or adjusted under 35 U.S.C. 154(b) by 240 days.

(21) Appl. No.: 17/872,772

(22) Filed: Jul. 25, 2022

(51) Int. Cl.
*G06T 5/70* (2024.01)
*G06T 5/50* (2006.01)
*H04N 23/68* (2023.01)
*H04N 23/951* (2023.01)

(52) U.S. Cl.
CPC ............... *G06T 5/70* (2024.01); *G06T 5/50* (2013.01); *H04N 23/682* (2023.01); *H04N 23/951* (2023.01)

(58) Field of Classification Search
CPC .......... G06T 5/70; G06T 5/50; H04N 23/682; H04N 23/951
See application file for complete search history.

(56) References Cited

U.S. PATENT DOCUMENTS

| | | | |
|---|---|---|---|
| 2010/0026880 A1* | 2/2010 | Ito | H04N 23/70 348/208.99 |
| 2010/0225772 A1* | 9/2010 | Murayama | H04N 23/6811 348/208.4 |
| 2019/0213712 A1* | 7/2019 | Shoa Hassani Lashdan | H04N 5/2621 |
| 2020/0382802 A1* | 12/2020 | Atkins | H04N 19/172 |
| 2022/0398700 A1* | 12/2022 | K S | H04N 23/71 |

* cited by examiner

*Primary Examiner* — Gevell V Selby
(74) *Attorney, Agent, or Firm* — ESPLIN & ASSOCIATES, PC

(57) ABSTRACT

Video frames are captured by an image capture device and stabilized to generate stabilized video frames. Multiple stabilized video frames are combined into single motion blurred video frames. Combination of multiple stabilized video frames into single motion blurred video frames produces motion blur within the single motion blurred video frames that is both physical and real.

20 Claims, 6 Drawing Sheets

SYSTEMS AND METHODS FOR SIMULATING MOTION BLUR

FIELD

This disclosure relates to simulating motion blur in a video by combining stabilized video frames.

BACKGROUND

Motion blur may create a dynamic look in a video. However, capturing video frames with motion blur may result in undesired artifacts in the video, such as if video frames with motion blur are stabilized. Motion blur may be inserted into video frames. For example, motion of pixel in the video frames (e.g., such as optical flow) may be measured and used to determine how and where to insert motion blur. Measuring motion in the video frames is computationally intensive, and takes time and power.

SUMMARY

This disclosure relates to simulating motion blur in videos. Visual information and/or other information may be obtained. The visual information may define video frames captured at a first frame rate by an image capture device. The video frames may be stabilized to generate stabilized video frames. Multiple ones of the stabilized video frames may be combined into single ones of motion blurred video frames. The combination of the multiple ones of the stabilized video frames into the single ones of the motion blurred video frames may reduce frame rate of the motion blurred video frames to a second frame rate smaller than the first frame rate.

A system for simulating motion blur in videos may include one or more electronic storages, one or more processors, and/or other components. An electronic storage may store visual information, information relating to video frames, information relating to frame rate, information relating to image capture device, information relating to stabilization of video frames, information relating to motion blurred video frames, and/or other information.

The processor(s) may be configured by machine-readable instructions. Executing the machine-readable instructions may cause the processor(s) to facilitate simulating motion blur in videos. The machine-readable instructions may include one or more computer program components. The computer program components may include one or more of a visual information component, a stabilization component, a motion blur component, and/or other computer program components.

The visual information component may be configured to obtain visual information and/or other information. The visual information may define video frames captured at a first frame rate by an image capture device. In some implementations, the video frames may be captured by the image capture device using 360 degree shutter.

In some implementations, the video frames captured at the first frame rate by the image capture device may include a video frame subset of a video frame set captured by the image capture device.

In some implementations, the video frames captured at the first frame rate by the image capture device may include staggered, burst video frames captured by the image capture device. Capture of the staggered, burst video frames by the image capture device may include capture of a first set of video frames at the first frame rate, followed by capture skipping of a second set of video frames at the first frame rate.

The stabilization component may be configured to stabilize the video frames. The video frames may be stabilized to generate stabilized video frames. The video frames may be stabilized during and/or after capture of the video frames.

The motion blur component may be configured to combine multiple ones of the stabilized video frames into single ones of motion blurred video frames. The combination of the multiple ones of the stabilized video frames into the single ones of the motion blurred video frames may reduce a frame rate of the motion blurred video frames to a second frame rate smaller than the first frame rate.

In some implementations, the first frame rate at which the video frames are captured by the image capture device may be 240 frames per second. The combination of the multiple ones of the stabilized video frames into the single ones of the motion blurred video frames may include combination of five consecutive ones of the stabilized video frames into the single ones of the video frames. The second frame rate to which the motion blurred video frames are reduced to may be 48 frames per second.

In some implementations, half of the motion blurred video frames may be removed for generation of a motion blurred video having a third frame rate of 24 frames per second.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
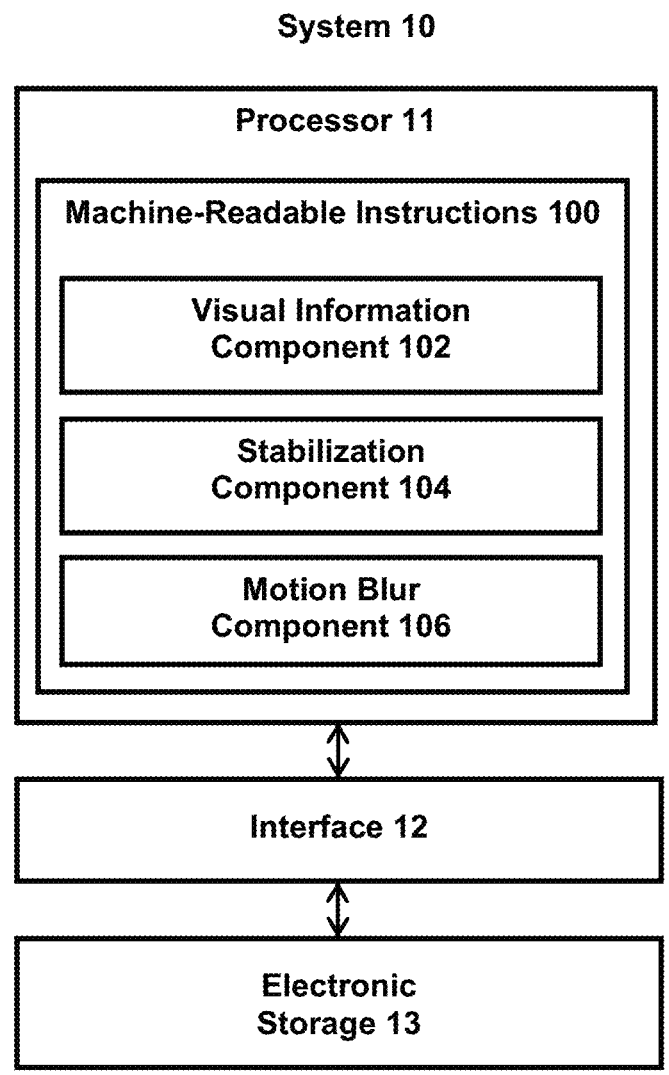
FIG. 1 illustrates an example system for simulating motion blur in videos.

FIG. 1 illustrates a system 10 for simulating motion blur in videos. The system 10 may include one or more of a processor 11, an interface 12 (e.g., bus, wireless interface), an electronic storage 13, and/or other components. Visual information and/or other information may be obtained by the processor 11. The visual information may define video frames captured at a first frame rate by an image capture device. The video frames may be stabilized by the processor 11 to generate stabilized video frames. Multiple ones of the stabilized video frames may be combined by the processor 11 into single ones of motion blurred video frames. The combination of the multiple ones of the stabilized video frames into the single ones of the motion blurred video frames may reduce frame rate of the motion blurred video frames to a second frame rate smaller than the first frame rate.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to video frames, information relating to frame rate, information relating to image capture device, information relating to stabilization of video frames, information relating to motion blurred video frames, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length (duration, number of frames) of the video. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video (s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

(01) Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device.

Figure 3:
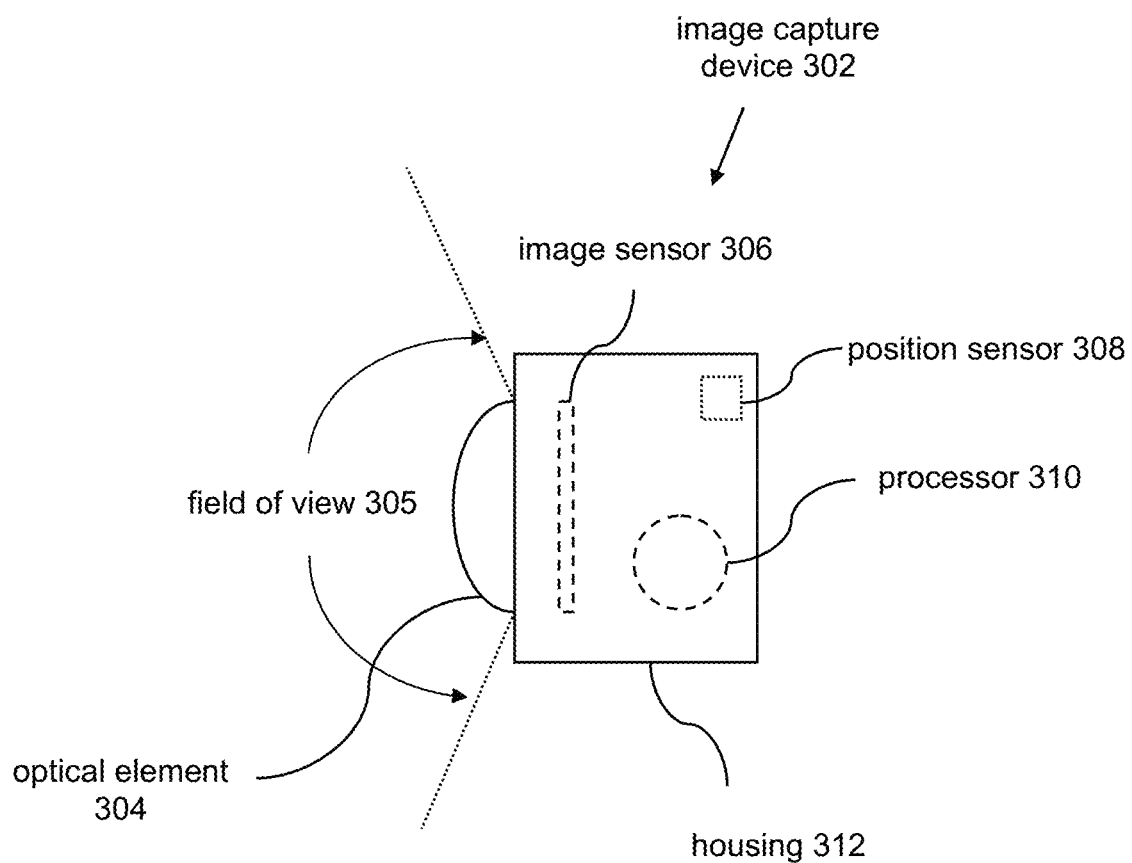
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). FIG. 3 illustrates an example image capture device 302. Video frames (visual content of video frames) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, a position sensor 308, a processor 310, and/or other components.

One or more components of the image capture device 302 may be the same as, be similar to, and/or correspond to one or more components of the system 10. For example, the processor 310 may be the same as, be similar to, and/or correspond to the processor 11. The housing may carry other components, such as the electronic storage 13. The image capture device 302 may include other components not shown in FIG. 3. The image capture device 302 may not include one or more components shown in FIG. 3. Other configurations of image capture devices are contemplated.

The optical element 304 may include instrument(s), tool (s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define video frames (visual content of video frames) by including information that defines one or more content, qualities, attributes, features, and/or other aspects of the video frames. For example, the visual information may define a video frame by including information that makes up the content of the video frame, and/or information that is used to determine the content of the video frame. For instance, the visual information may include information that makes up and/or is used to determine the arrangement of pixels, characteristics of pixels, values of pixels, and/or other aspects of pixels that define visual content of the video frame. For example, the visual information may include information that makes up and/or is used to determine pixels of the video frame. Other types of visual information are contemplated.

Capture of video frames by the image sensor 306 may include conversion of light received by the image sensor 306 into output signals/visual information defining visual content of the video frames. Capturing video frames may include recording, storing, and/or otherwise capturing the visual content for use in generating video frames. For example, during a capture duration, the visual output signal generated by the image sensor 306 and/or the visual information conveyed by the visual output signal may be used to record, store, and/or otherwise capture the visual content for use in generating video frames.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The position sensor 308 may include sensor(s) that measures experienced positions and/or motions. The position sensor 308 may convert experienced positions and/or motions into output signals. The output signals may include electrical signals. For example, the position sensor 308 may refer to a set of position sensors, which may include one or more inertial measurement units, one or more accelerometers, one or more gyroscopes, and/or other position sensors. The position sensor 308 may generate output signals conveying information that characterizes positions and/or motions of the position sensor 308 and/or device(s) carrying the position sensor 308, such as the image capture device 302 and/or the housing 312.

For example, the position sensor 308 may be configured to generate a position output signal based on positions of the image capture device 302 during the capture duration. The position output signal may convey position information that characterizes positions of the image capture device 302 at different moments (points in time, time durations) within the capture duration. The position information may characterize positions of the image capture device 302 based on specific translational and/or rotational positions of the image capture device 302 and/or based on changes in translational and/or rotational positions of the image capture device 302 as a function of progress through the capture duration. That is, the position information may characterize translational and/or rotational positions of the image capture device 302 and/or changes in translational and/or rotational positions (motion) of the image capture device 302 (e.g., direction, amount, velocity, acceleration) during the capture duration.

The position information may be determined based on signals generated by the position sensor 308 and independent of the information/signals generated by the image sensor 306. That is, position information may be determined without using visual content/images/videos generated by the image sensor 306. Use of visual content/images/videos to determine positions/motions of the image capture device 302 may be computationally expensive in terms of processing power, processing time, and/or battery consumption. Using the information/signals from the position sensor 308 to determine positions/motions of image capture device 302 may be computationally cheaper. That is, less processing power, processing time, and/or battery consumption may be required when positions/motions of the image capture device 302 are determined from the information/signals from the position sensor 308 than the information/signals from the image sensor 306. The position information determined independent of the image information may be used to determine the positions of the image capture device 302 during the capture duration.

In some implementations, the position information may include data from the position sensor (e.g., gyroscope data, accelerometer data) with time stamps per video frames captured at different moments. For example, the position information may include gyroscope data and/or accelerometer data per individual video frames captured by the image capture device. In some implementations, calibration of an inertial measurement unit may be used to combine different data within the position information.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 302 may capture video frames at a particular frame rate. The exposure length used to capture the video frames may be short to reduce/eliminate motion blur within individual video frames. The video frames may be stabilized, and multiple stabilized video frames may be combined in a semi-transparent way to generate motion blurred video frames. Combination of multiple stabilized video frames into a single motion blurred video frame may produce motion blur within the single motion blurred video frame that is both physical and real. Such motion blurred video frames may have less/no artifacts due to less/no motion blur being captured with the video frames. Combination of multiple stabilized video frames into a single motion blurred video frame may also reduce the frame rate motion blurred video frames.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate simulating motion blur in videos. The machine-readable instructions 100 may include one or more computer program components. The machine-readable instructions 100 may include one or more of a visual information component 102, a stabilization component 104, a motion blur component 106, and/or other computer program components.

The visual information component 102 may be configured to obtain visual information and/or other information. Obtaining visual information may include one or more of accessing, acquiring, analyzing, determining, examining, generating, identifying, loading, locating, opening, receiving, retrieving, reviewing, selecting, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations. The visual information component 102 may obtain information from one or more hardware components (e.g., an image sensor) and/or one or more software components (e.g., software running on a computing device).

Visual information may be obtained during capture of video frames and/or after capture of the video frames by one or more image capture devices and/or one or more image sensors. For example, the visual information component 102 may obtain visual information defining video frames while/as the video frames are being captured by an image capture device. The visual information component 102 may obtain visual information defining video frames after all video frames have been captured and stored in memory (e.g., the electronic storage 13).

In some implementations, the visual information component 102 may obtain visual information based on user interaction with a user interface/application (e.g., video editing application, video player application), and/or other information. For example, a user interface/application may provide option(s) for a user to select visual content in which motion blur is to be simulated. The visual information defining video frames may be obtained based on the user's selection of the video frames/video through the user interface/video application. Other selections of video frames/video for retrieval of visual information are contemplated.

The visual information may define video frames captured at a particular frame rate by an image capture device. The frame rate at which the image capture device captures the video frames may be referred to as a capture frame rate. A capture frame rate may include a rate at which the video frames are captured by the image capture device. A capture frame rate may refer to a rate at which video frames are captured based on the visual output signal generate by image sensor(s) and/or other information. A capture frame rate may refer to a frequency at which the video frames are captured. For example, a capture frame rate may define a number of video frames that are captured per a time duration (e.g., number of video frames per second). A capture frame rate may have one or more values defining the particular rate at which video frames are captured. The value(s) may characterize, reflect, specify, and/or otherwise define the rate at which the video frames are captured. In some implementations, a high frame rate may be used by the image capture device to capture the video frames. The high value of the frame rate may allow visual content to be captured within the video frames without motion blur within individual video frames. Higher value of the frame rate may enable sharp content to be captured with more image capture device movement (e.g., more shaking of the image capture device). Video frames captured with a higher frame rate may include less motion blur than video frames captured with a lower frame rate.

In some implementations, the video frames may be captured by the image capture device using 360 degree shutter. With 360 degree shutter, the shutter speed of the image capture device may be the inverse of the frame rate at which the video frames are captured. For example, for video frames captured using 240 frames per second, the shutter speed with 360 degree shutter may be ¹⁄₂₄₀ second. Use of 360 degree shutter may reduce/eliminate ghosting effect within the captured video frames. Use of other frame rates and other shutter angles are contemplated.

In some implementations, the image capture device may use shutter and image sensor gain to control the exposure used to capture the video frames. In some implementations, the image capture device may not include shutter control. Such image capture device may use aperture control and/or neutral-density filter to control the exposure used to capture the video frames.

In some implementations, the visual information obtained by the visual information component 102 may define a subset of a video frame set captured by the image capture device. The video frame set may refer to all of the video frames captured using a particular frame rate, and the subset of the video frame set may include some, and not all, of the video frames captured using the particular frame rate. That is, the visual information component 102 may obtain only some, and not all, of the video frames captured by the image capture device. For example, the visual information component 102 may obtain visual information defining every other video frames captured by the image capture device. Obtaining other subsets of video frames is contemplated.

In some implementations, the visual information obtained by the visual information component 102 may define staggered, burst video frames captured by the image capture device. Staggered, burst video frames may refer to sequences of video frames captured with skipping between the sequences. Capture of staggered, burst video frames by the image capture device may include the image capture device alternating between capture and skipping (capture skipping) of the video frames using the same frame rate. Capture of staggered, burst video frames by the image capture device may include capture of one set (sequence) of video frames at a particular frame rate, followed by capture skipping of the following set (sequence) of video frames at the same frame rate, followed by capture of another set of video frames at the same frame rate, followed by capture skipping of the following set of video frames at the same frame rate, and so forth.

For example, the image capture device may capture video frames using 240 frames per second. The image capture device may operate in a staggered, burst video frames mode to capture staggered, burst video frames. Using 240 frames per second, the image capture device may capture a sequence of 5 video frames, then skip capture of the next 5 video frames, then capture another sequence of 5 video frames, then skip capture of the next 5 video frames, and so forth. The staggered, burst video frames may include different sets of multiple adjacent video frames, with a time gap between individual sets of video frames. Use of other frame rates and other numbers of video frames in captured/skipped sets are contemplated.

The stabilization component 104 may be configured to stabilize the video frames. The video frames may be stabilized to generate stabilized video frames. The video frames may be stabilized during and/or after capture of the video frames. For example, the stabilization component 104 may stabilize the video frames while/as the video frames are being captured by an image capture device. The stabilization component 104 may stabilize the video frames after all video frames have been captured and stored in memory (e.g., the electronic storage 13).

The video frames may be stabilized to provide a smoother view of the video. Stabilization of video frames may include using smaller spatial extents of video frames to provide a punchout view of the video frames that creates a more stable view than when viewing the entirety of the video frames. A punchout of the video frames may refer to an output of one or more portions of the video frames for presentation (e.g., current presentation, future presentation based on video generated using the punchout). A punchout of the video frames may refer to extents of the video frames that is obtained for viewing and/or extraction. A viewing window may be used to determine the extents of the video frames to be used to stabilize the video frames. A viewing window may define extents of the video frames to be included within the stabilized video frames. A viewing window may define extents of the video frames to be included within a punchout of the video frames. Inclusion of the extents of the video frames within the viewing windows in the stabilized video frames may effectuate stabilization of the video frames via selective cropping.

In some implementations, the video frames may be stabilized based on movement of the image capture device during capture of the video frames and/or other information. The placement of the viewing window within the video frames (field of view of the visual content of the video frames) may be determined based on the movement of the image capture device during capture of the video frames and/or other information. For example, the placement of the viewing window within the video frames may be determined based on rotational positions (changes in rotational positions) of the image capture device during the capture duration to provide a stabilized punchout of the video frames.

The placement of the viewing window may be determined to compensate for movement (e.g., shaking and/or vibration) of the image capture device during the capture duration such that the stabilized punchout of the video frames provides a view of the video frames that appears to have been captured by the image capture device without/with less movement. The rotation, position, size, shape, and/or other characteristics of the viewing window may be determined based on the rotational positions of the image capture device to provide a stabilized punchout of the video frames.

In some implementations, the placement of the viewing window may be determined to minimize a shakiness indicator for the video frames, with the value of the shakiness indicator determined based on a combination of rotational velocity and rotational acceleration of the image capture device. In some implementations, the stabilization of the video frames may be performed based on future movement of the image capture device. For example, the placement of the viewing window for a video frame captured at particular moment in the video may be determined based on movement of the image capture device at later moments in the video.

In some implementations, the placement of the viewing window may be determined based on the rotational positions of the image capture device during the capture of the video frames to provide a horizon-leveled punchout of the video frames. The rotation, position, size, shape, and/or other characteristics of the viewing window may be determined based on the rotational positions of the image capture device to provide a horizon-leveled punchout of the video frames. A horizon-leveled punchout of the video frames may refer to a punchout of the video frames that provides a horizon-leveled view of the video frames.

A horizon leveled punchout of the video frames may refer to a punchout of the video frames in which extents of the video frames are selected for presentation such that the video frames appears leveled/more leveled with respect to the horizon. The horizon leveled view of the video frames may refer to view of the video frames in which the video frames appears leveled with respect to the horizon. The horizon leveled view of the video frames may refer to view of the video frames in which the video frames appears more leveled with respect to the horizon than the original video frames. For example, the image capture device may have been tilted to the left and/or right during the capture duration. The viewing window may be determined to compensate for the tiling of the image capture device during the capture duration such that the horizon-leveled punchout of the video frames provides a view of the video frames that appears to have been captured by the image capture device without/with less tilting. Generation of video frames that is horizon leveled may be referred to as horizon leveling.

In some implementations, the video frames may be stabilized based on placement of one or more things (e.g., an object of interest) within the video frames and/or other information. Stabilization of video frames based on the placement of a thing within the video frames may include use of a viewing window to provide a punchout of the video frames in which the thing is stable/more stable. Stabilization of the video frames based on the placement of a thing within the video frames may include use of a viewing window to provide a punchout of the video frames in which the thing does not move/moves less than the original video frames. For example, the thing may include a face, and the video frames may be stabilized to provide a consistent view of the face within the stabilized video frames. Rather than using how the image capture device was moved during the capture duration, the placement of the thing within the video frames may be used to determine placement of the viewing window. The viewing window may be determined to compensate for changes in placement of the thing within the video frames.

The motion blur component 106 may be configured to combine multiple ones of the stabilized video frames into single ones of motion blurred video frames. Motion blurred video frames may refer to video frames in which motion blur has been simulated. Motion blur in a single motion blurred video frame may be simulated by combining multiple video frames into the single motion blurred video frame. Combining multiple stabilized video frames into a single motion blurred video frame may include merging multiple stabilized video frames into the single motion blurred video frame. For example, multiple stabilized video frames may be composited in a semi-transparent to generate the single motion blurred video frames. For example, 20% transparency may be applied to 5 stabilized video frames and added together to generate a single motion blurred video frame. Because the video frames have already been stabilized, combining consecutive/adjacent/nearby stabilized video frames may generate realistic motion blur within the motion blurred video frames. That is, stabilization of the video frames may have resulted in consecutive/adjacent/nearby stabilized video frames depicting same/similar view of the scene, and combining these stabilized video frames may produce motion blur for things that moved within the scene. If the video frames are captured with 360 degree shutter, the combination of the video frames may result in the motion blurred video frames include simulated 180 degree shutter.

The combination of the multiple ones of the stabilized video frames into the single ones of the motion blurred video frames may reduce a frame rate of the motion blurred video frames to be less than the frame rate at which the video frames were captured by the image capture device. For example, generation of single motion blurred video frames by combining 5 stabilized video frames may reduce the frame rate by a factor of 5. Combination of other numbers of stabilized video frames and use of other transparency value are contemplated.

Figure 4:
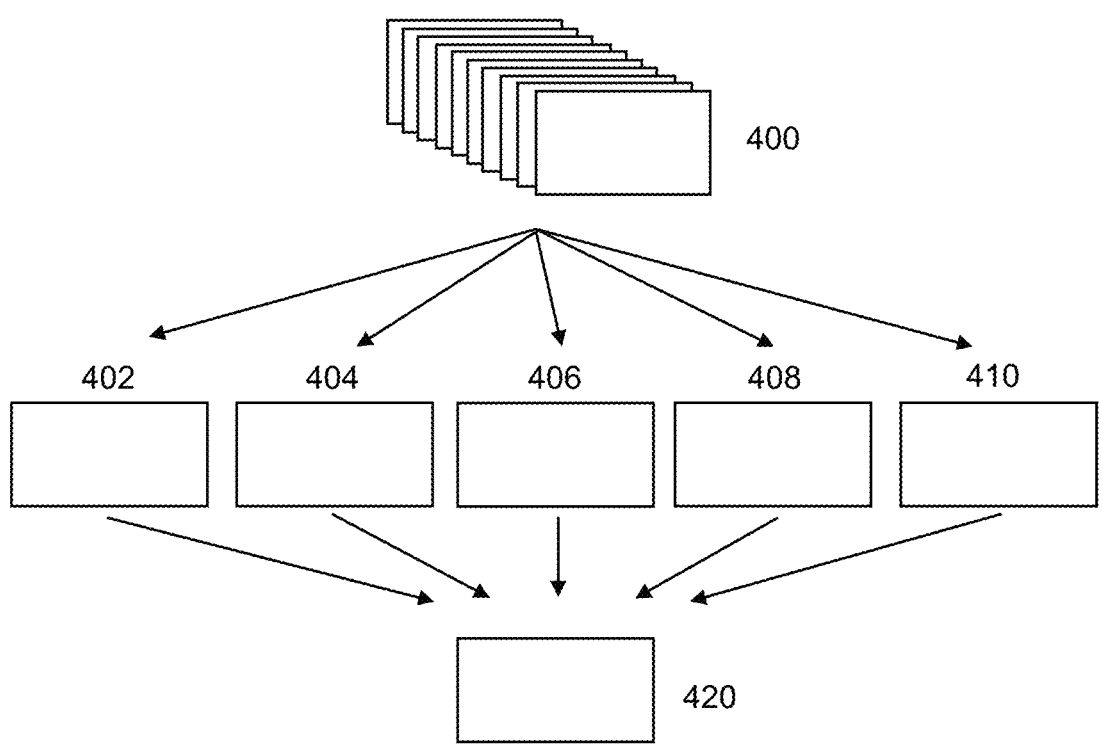
FIG. 4 illustrates an example combination of stabilized video frames into a motion blurred video frame.

FIG. 4 illustrates an example combination of stabilized video frames into a motion blurred video frame. Video frame 400 may be captured by an image capture device at a frame rate of 240 frames per second. The video frames 400 may be stabilized. Five consecutive stabilized video frames 402, 404, 406, 408, 410 may be combined into a single motion blurred video frame 420. Other single motion blurred video frames may be generated by combining other five consecutive stabilized video frames. Use of the high frame rate at capture may reduce/eliminate motion blur from the time of video frame capture, while combining the consecutive stabilized video frames 402, 404, 406, 408, 410 into the single motion blurred video frame 420 may generate motion blur within the single motion blurred video frame 420 that is both physical and real. Combination of five consecutive stabilized video frames into the single video frames may result in the frame rate of the motion blurred video being reduced to 48 frames per second.

In some implementations, some of the motion blurred video frames may be removed for generation of a motion blurred video. Some of the motion blurred video frames may be removed to generate a motion blurred video have a desired frame rate. For example, referring back to the example of video frames captured at 240 frames per second, which have been combined into motion blurred video frames having 48 frames per second, half of the motion blurred video frames may be removed for generation of a motion blurred video having a frame rate of 24 frames per second. Half of the motion blurred video frames may be removed by removing every other motion blurred video frame. Removal of other number/sequence of motion blurred video frames is contemplated.

In some implementations, rather than removing unused video frames, the image capture device may skip capture of the video frames that would be unused in the motion blurred video. For example, responsive to user selection of a motion blurred video capture, the image capture device may capture staggered, burst video frames, where the image capture device alternates between capturing and skipping capture of video frames. Alternating capture/skipping of video frames may provide power savings and/or reduce heating of the image capture device (e.g., reduce image sensor heating). Alternating capture/skipping of video frames may enable the image capture device to utilize the saved resource for other purposes.

For example, alternating capture/skipping of video frames may enable the image capture device to capture video frames at a higher resolution than is normally possible. For example, an image capture device may be limited to resolution of 4 k when capturing video frames at 120 frames per second, while being limited to resolution of 5.3 k when capturing video frames at 60 frames per second. By alternating capture/skipping of video frames, the image capture device may be able to capture video frames with resolution of 5.3 k at 120 frames per second. By skipping capture of video frames, the image capture device may capture the same number of video frames as if the image capture device is continuously capturing video frames at 60 frames per second.

Figure 5:
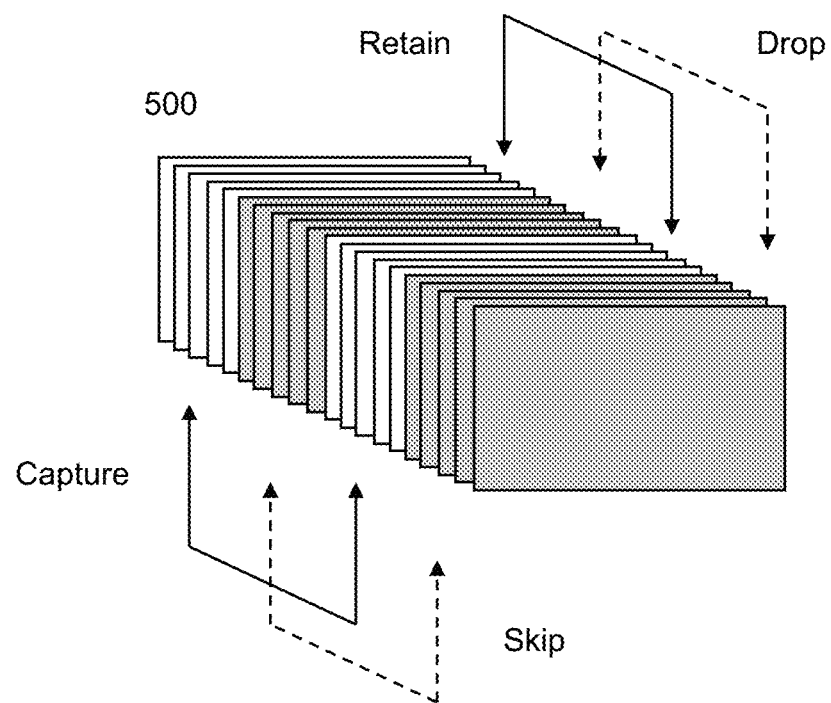
FIG. 5 illustrates example video frames obtained to simulate motion blur in a video.

FIG. 5 illustrates example video frames obtained to simulate motion blur in a video. In FIG. 5, 20 video frames 500 may be continuously captured by an image capture device at 120 frames per second. Out of these video frames 500, half of them may be retained for use in simulating motion blur in a video while half of them may be dropped (e.g., deleted). Subsets of video frames that are retained and dropped may be alternated. For example, as shown in FIG. 5, the first 5 video frames may be retained, the next 5 video frames may be dropped, the next 5 video frames may be retained, and the next 5 video frames may be dropped. The video frames may be dropped since they are not used to generate motion blurred video frames for inclusion in the motion blurred video.

Rather than continuously capturing video frames and dropping some of the video frames, the image capture device may be operated to capture only those video frames that will be used to generate motion blurred video frames for inclusion in the motion blurred video. The image capture device may alternate between capturing and skipping consecutive video frames. Subsets of video frames that are captured and skipped may be alternated. For example, as shown in FIG. 5, the first 5 video frames may be captured, capture of the next 5 video frames may be skipped, the next 5 video frames may be captured, and capture of the next 5 video frames may be skipped. Capture of the video frames may be skipped since they are not used to generate motion blurred video frames for inclusion in the motion blurred video. Other retention/dropping and capture/skipping of video frames are contemplated.

Figure 6:
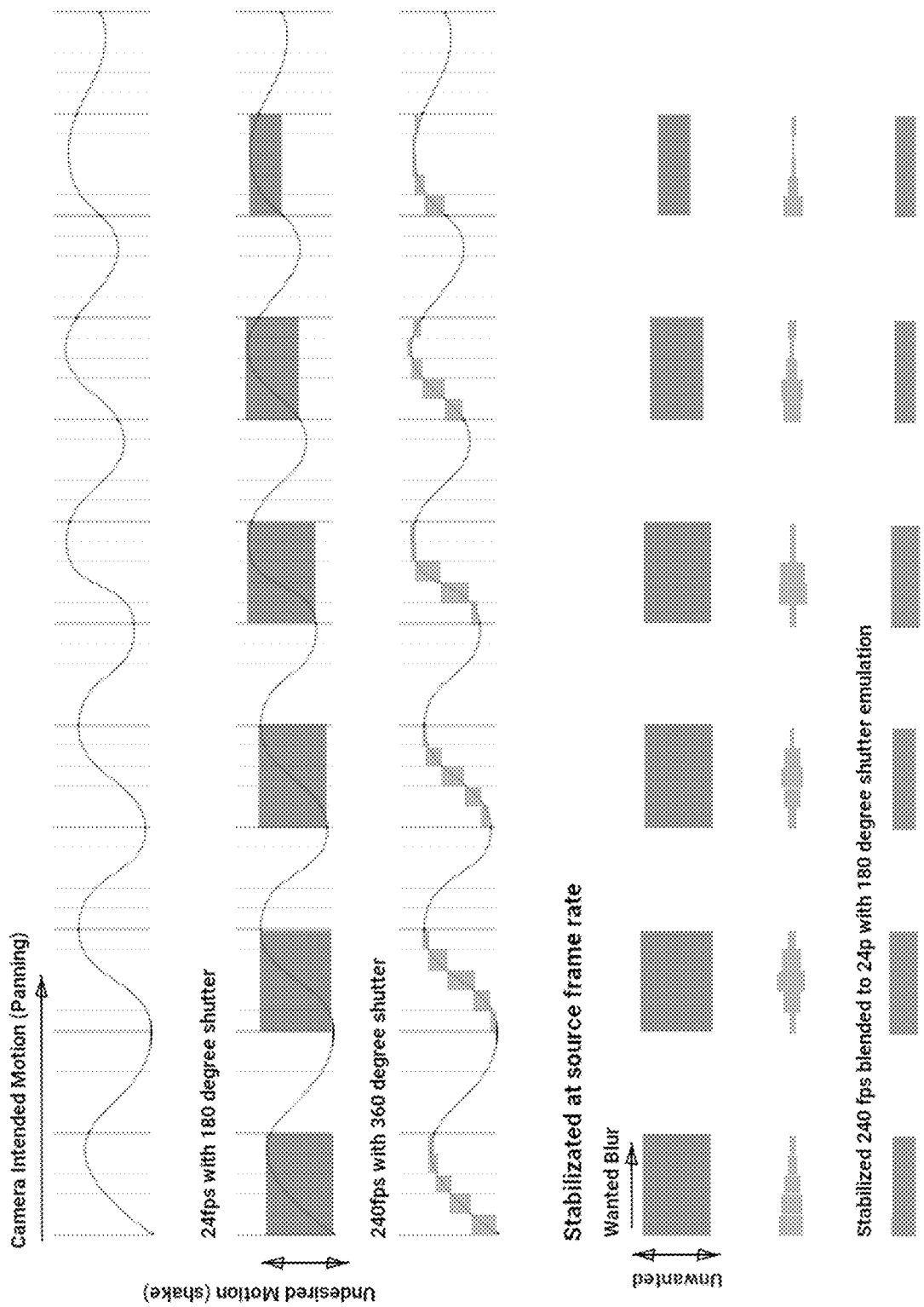
FIG. 6 illustrates example removal of unintended motion and preservation of intended motion in a motion blurred video.

FIG. 6 illustrates example removal of unintended motion and preservation of intended motion in a motion blurred video. Intended motion of the image capture device may refer to motion that the user wants to include in the motion blurred video. Intended motion of the image capture may cause desired/wanted blurring of pixels within the motion blurred video. Unintended motion of the image capture device may refer to motion that the user does not want to include in the motion blurred video. Unintended motion of the image capture device may cause undesired/unwanted blurring of pixels within the motion blurred video.

For example, in FIG. 6, intended motion of the image capture device may include panning (e.g., left to right) of the image capture device while unintended motion of the image capture device may include shaking (e.g., up and down) of the image capture device. Capturing the video frames at 24 frames per second with 180 degree shutter may result in the unintended motion being captured as motion blur within individual video frames. Such capture of video frames may result in the motion blurred video including intended/desired motion blur in the horizontal direction and unintended/undesired motion blur in the vertical direction. Capturing the video frames at 240 frames per second with 360 degree shutter may result in the unintended motion being captured less as smaller motion blur within individual video frames. Capturing the video frames at 240 frames per second with 360 degree shutter may result in fewer number of video frames including motion blur in the vertical direction.

Using the approach of the present disclosure, with the video frames stabilized at source frame rate (of 240 frames per second), motion blur due to panning may be synthetized within the video frames. Thus, the intended motion of the image capture device in the horizontal direction may be preserved within the motion blurred video. Because the high frame rate of video frame capture reduced the unintended/undesired motion blur in the vertical direction within the video frames, the unintended/undesired motion of the image capture device in the vertical direction may be reduced within the motion blurred video. In this example, generation of the motion blurred video frames via combination of every other five consecutive stabilized video frames into single video frames may result in the motion blurred video having (1) the same/similar horizontal motion blur as a video captured at 24 frames per second using 180 degree shutter, and (2) less motion blur in the vertical direction than a video captured at 24 frames per second using 180 degree shutter.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
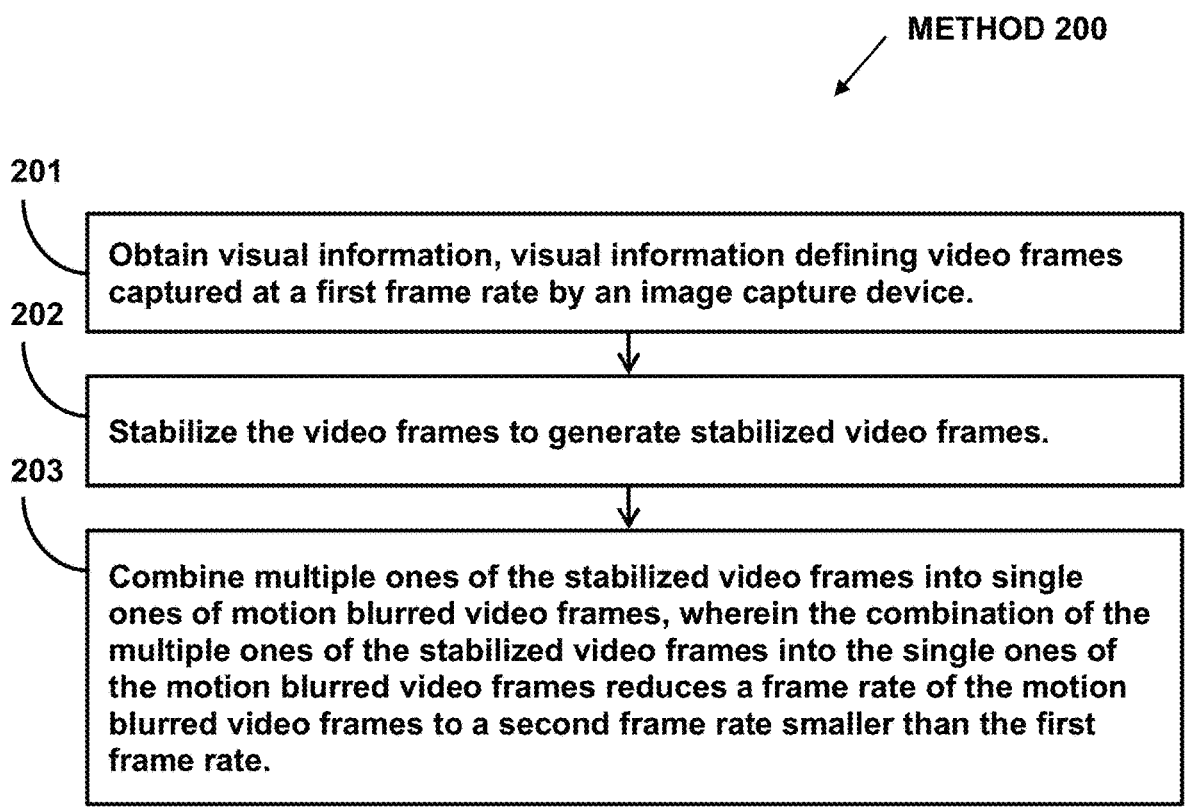
FIG. 2 illustrates an example method for simulating motion blur in videos.

FIG. 2 illustrates method 200 for simulating motion blur in videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, visual information and/or other information may be obtained. The visual information may define video frames captured at a first frame rate by an image capture device. In some implementation, operation 201 may be performed by a processor component the same as or similar to the visual information component 102 (Shown in FIG. 1 and described herein).

At operation 202, the video frames may be stabilized to generate stabilized video frames. In some implementation, operation 202 may be performed by a processor component the same as or similar to the stabilization component 104 (Shown in FIG. 1 and described herein).

At operation 203, multiple ones of the stabilized video frames may be combined into single ones of motion blurred video frames. The combination of the multiple ones of the stabilized video frames into the single ones of the motion blurred video frames may reduce frame rate of the motion blurred video frames to a second frame rate smaller than the first frame rate. In some implementation, operation 203 may be performed by a processor component the same as or similar to the motion blur component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for simulating motion blur in videos, the system comprising:
   one or more physical processors configured by machine-readable instructions to:
      obtain visual information, visual information defining video frames captured at a first frame rate by an image capture device using 360 degree shutter, wherein the video frames captured at the first frame rate by the image capture device include a video frame subset of a video frame set captured by the image capture device or staggered, burst video frames captured by the image capture device, wherein capture of the staggered, burst video frames by the image capture device include capture of a first set of video frames at the first frame rate, followed by capture skipping of a second set of video frames at the first frame rate;
      stabilize the video frames to generate stabilized video frames; and
      combine multiple ones of the stabilized video frames into single ones of motion blurred video frames, wherein the combination of the multiple ones of the stabilized video frames into the single ones of the motion blurred video frames reduces a frame rate of the motion blurred video frames to a second frame rate smaller than the first frame rate.

2. The system of claim 1, wherein the first frame rate at which the video frames are captured by the image capture device is 240 frames per second.

3. A system for simulating motion blur in videos, the system comprising:
   one or more physical processors configured by machine-readable instructions to:
      obtain visual information, visual information defining video frames captured at a first frame rate by an image capture device, wherein the video frames captured at the first frame rate by the image capture device include staggered, burst video frames captured by the image capture device, wherein capture of the staggered, burst video frames by the image capture device include capture of a first set of video frames at the first frame rate, followed by capture skipping of a second set of video frames at the first frame rate;

stabilize the video frames to generate stabilized video frames; and combine multiple ones of the stabilized video frames into single ones of motion blurred video frames, wherein the combination of the multiple ones of the stabilized video frames into the single ones of the motion blurred video frames reduces a frame rate of the motion blurred video frames to a second frame rate smaller than the first frame rate.

4. The system of claim 3, wherein the video frames are captured using 360 degree shutter.

5. The system of claim 3, wherein the video frames captured at the first frame rate by the image capture device include a video frame subset of a video frame set captured by the image capture device.

6. A system for simulating motion blur in videos, the system comprising:

one or more physical processors configured by machine-readable instructions to:

obtain visual information, visual information defining video frames captured at a first frame rate by an image capture device, wherein the first frame rate at which the video frames are captured by the image capture device is 240 frames per second;

stabilize the video frames to generate stabilized video frames; and combine multiple ones of the stabilized video frames into single ones of motion blurred video frames, wherein the combination of the multiple ones of the stabilized video frames into the single ones of the motion blurred video frames reduces a frame rate of the motion blurred video frames to a second frame rate smaller than the first frame rate.

7. The system of claim 6, wherein the combination of the multiple ones of the stabilized video frames into the single ones of the motion blurred video frames includes combination of five consecutive ones of the stabilized video frames into the single ones of the video frames.

8. The system of claim 7, wherein the second frame rate to which the motion blurred video frames are reduced to is 48 frames per second.

9. The system of claim 8, wherein half of the motion blurred video frames are removed for generation of a motion blurred video having a third frame rate of 24 frames per second.

10. The system of claim 6, wherein the video frames are captured using 360 degree shutter.

11. The system of claim 6, wherein the video frames captured at the first frame rate by the image capture device include a video frame subset of a video frame set captured by the image capture device.

12. A method for simulating motion blur in videos, the method performed by a computing system including one or more processors, the method comprising:

obtaining, by the computing system, visual information, visual information defining video frames captured at a first frame rate by an image capture device, wherein the video frames captured at the first frame rate by the image capture device include staggered, burst video frames captured by the image capture device, wherein capture of the staggered, burst video frames by the image capture device include capture of a first set of video frames at the first frame rate, followed by capture skipping of a second set of video frames at the first frame rate;

stabilizing, by the computing system, the video frames to generate stabilized video frames; and combining, by the computing system, multiple ones of the stabilized video frames into single ones of motion blurred video frames, wherein the combination of the multiple ones of the stabilized video frames into the single ones of the motion blurred video frames reduces a frame rate of the motion blurred video frames to a second frame rate smaller than the first frame rate.

13. The method of claim 12, wherein the video frames are captured using 360 degree shutter.

14. The method of claim 12, wherein the video frames captured at the first frame rate by the image capture device include a video frame subset of a video frame set captured by the image capture device.

15. A method for simulating motion blur in videos, the method performed by a computing system including one or more processors, the method comprising:

obtaining, by the computing system, visual information, visual information defining video frames captured at a first frame rate by an image capture device, wherein the first frame rate at which the video frames are captured by the image capture device is 240 frames per second;

stabilizing, by the computing system, the video frames to generate stabilized video frames; and combining, by the computing system, multiple ones of the stabilized video frames into single ones of motion blurred video frames, wherein the combination of the multiple ones of the stabilized video frames into the single ones of the motion blurred video frames reduces a frame rate of the motion blurred video frames to a second frame rate smaller than the first frame rate.

16. The method of claim 15, wherein the combination of the multiple ones of the stabilized video frames into the single ones of the motion blurred video frames includes combination of five consecutive ones of the stabilized video frames into the single ones of the video frames.

17. The method of claim 16, wherein the second frame rate to which the motion blurred video frames are reduced to is 48 frames per second.

18. The method of claim 17, wherein half of the motion blurred video frames are removed for generation of a motion blurred video having a third frame rate of 24 frames per second.

19. The method of claim 15, wherein the video frames are captured using 360 degree shutter.

20. The method of claim 15, wherein the video frames captured at the first frame rate by the image capture device include a video frame subset of a video frame set captured by the image capture device.

* * * * *